(12) United States Patent
Iguchi et al.

(10) Patent No.: US 11,718,916 B2
(45) Date of Patent: Aug. 8, 2023

(54) ELECTROLESS CO—W PLATING FILM

(71) Applicant: C. Uyemura & Co., Ltd., Osaka (JP)

(72) Inventors: Shoji Iguchi, Aichi (JP); Akio Itamura, Aichi (JP); Shoichi Fukui, Aichi (JP); Yukinori Oda, Osaka (JP); Masaaki Sato, Osaka (JP); Yoshihito Ii, Osaka (JP); Hiroki Okubo, Osaka (JP)

(73) Assignee: C. UYEMURA & CO., LTD., Osaka (JP)

( * ) Notice: Subject to any disclaimer, the term of this patent is extended or adjusted under 35 U.S.C. 154(b) by 0 days.

(21) Appl. No.: 17/750,660

(22) Filed: May 23, 2022

(65) Prior Publication Data

US 2022/0389587 A1 Dec. 8, 2022

(30) Foreign Application Priority Data

May 27, 2021 (JP) .................................. 2021-089256
Feb. 1, 2022 (JP) .................................. 2022-014117
Apr. 22, 2022 (JP) .................................. 2022-070732

(51) Int. Cl.
*C23C 18/32* (2006.01)
*C23C 18/00* (2006.01)
(Continued)

(52) U.S. Cl.
CPC .............. *C23C 18/32* (2013.01); *B32B 15/04* (2013.01); *B32B 15/043* (2013.01); *C22C 19/00* (2013.01); *C22C 19/07* (2013.01); *C23C 18/34* (2013.01); *C23C 18/36* (2013.01); *C23C 18/48* (2013.01); *C23C 18/50* (2013.01); *C23C 18/54* (2013.01); *C23C 30/00* (2013.01); *C23C 30/005* (2013.01);
(Continued)

(58) Field of Classification Search
CPC ....... C23C 30/00; C23C 30/005; C23C 18/32; C23C 18/36; C23C 18/1844; C23C 18/34; C23C 18/48; C23C 18/50; C23C 18/54; C22C 19/07; C22C 19/00; B32B 15/04; B32B 15/043; Y10T 428/1284; Y10T 428/1291; Y10T 428/12931; Y10T 428/12937; Y10T 428/12944; Y10T 428/24967; Y10T 428/2495; Y10T 428/24975; Y10T 428/265
See application file for complete search history.

(56) References Cited

U.S. PATENT DOCUMENTS

2011/0101536 A1* 5/2011 Chiang ............. H01L 21/76849
257/773
2011/0171775 A1* 7/2011 Yamamoto ........ H01L 21/02126
438/99

FOREIGN PATENT DOCUMENTS

JP 2002-327279 11/2002
JP 2010-147245 7/2010

OTHER PUBLICATIONS

T. Iwashige, et al., "Effect of W content in Co—P metallization on both oxidation resistance and resin adhesion," J. Mater. Sci (2020) 55:644-659 (Sep. 20, 2019). (Year: 2019).*

* cited by examiner

*Primary Examiner* — Michael E. La Villa
(74) *Attorney, Agent, or Firm* — Wenderoth, Lind & Ponack, L.L.P.

(57) ABSTRACT

An object of the present invention is to provide a new electroless plating film which can prevent the diffusion of molten solder to a metal material constituting a conductor. The present invention is an electroless Co—W plating film, wherein content of W is in an amount of 35 to 58 mass % and a thickness of the film is 0.05 μm or more.

7 Claims, 2 Drawing Sheets

(51) Int. Cl.
*C23C 30/00* (2006.01)
*C22C 19/00* (2006.01)
*C22C 19/07* (2006.01)
*B32B 15/04* (2006.01)
*C23C 18/36* (2006.01)
*C23C 18/34* (2006.01)
*C23C 18/54* (2006.01)
*C23C 18/50* (2006.01)
*C23C 18/48* (2006.01)
*C23C 18/18* (2006.01)

(52) U.S. Cl.
CPC ..... *C23C 18/1844* (2013.01); *Y10T 428/1284* (2015.01); *Y10T 428/1291* (2015.01); *Y10T 428/12931* (2015.01); *Y10T 428/12937* (2015.01); *Y10T 428/12944* (2015.01); *Y10T 428/2495* (2015.01); *Y10T 428/24967* (2015.01); *Y10T 428/24975* (2015.01); *Y10T 428/265* (2015.01)

[Fig.1]
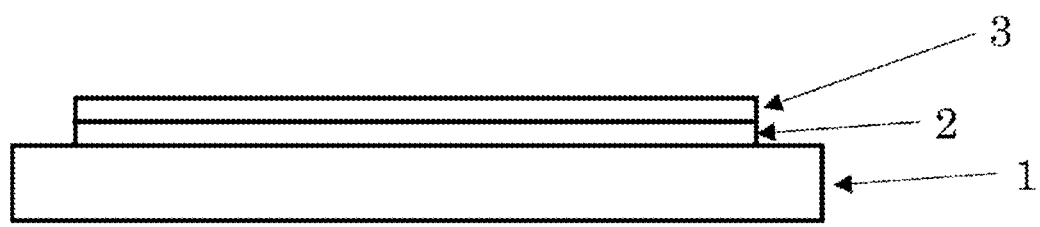
[Fig.2]
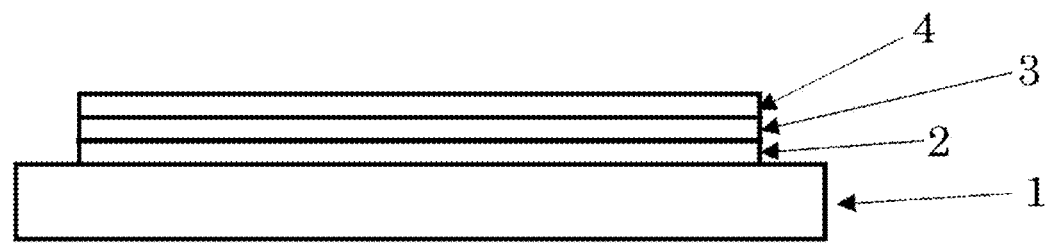

[Fig.3]
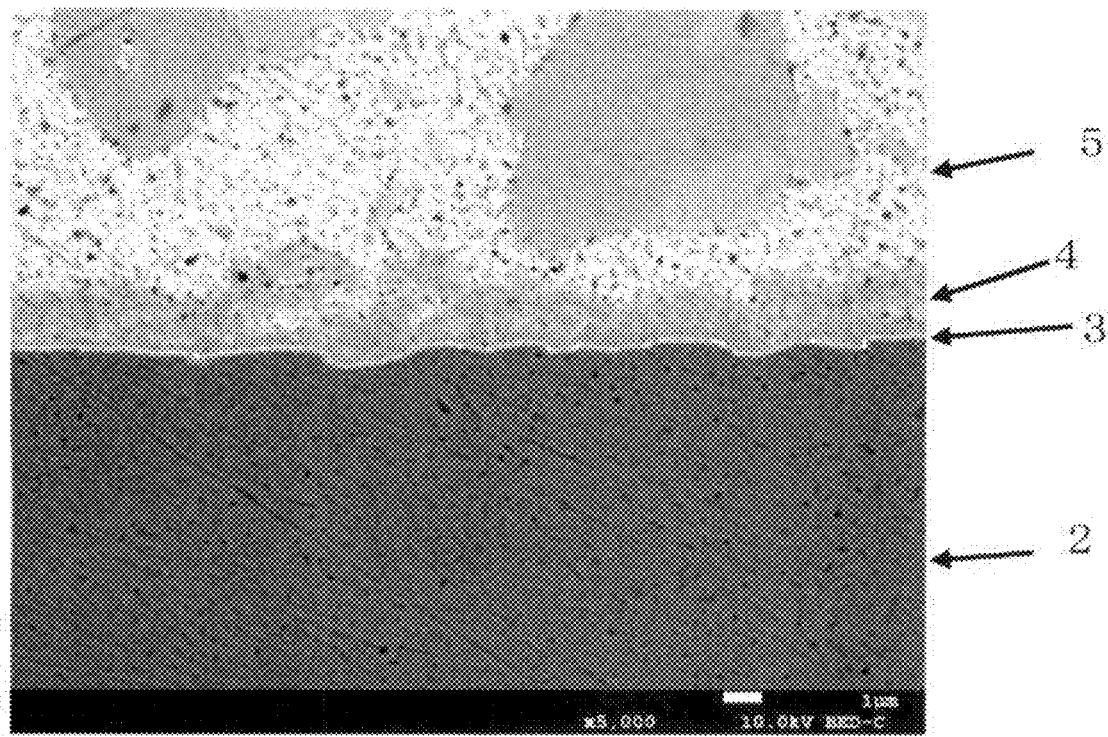

ELECTROLESS CO—W PLATING FILM

CROSS-REFERENCE TO RELATED APPLICATIONS

This application is related to and claims priority under 35 U.S.C. 119 to Japanese patent application No. 2021-089256, filed on May 27, 2021, 2022-014117, filed on Feb. 1, 2022 and 2022-070732, filed on Apr. 22, 2022.

TECHNICAL FIELD

The present invention relates to an electroless Co—W plating film and an electroless Co—W plating solution.

BACKGROUND ART

In the production process of the semiconductor, plating treatment such as electroless Ni plating is conducted on a conductor before soldering aiming to prevent solder diffusion on metal materials constituting conductors such as wiring pad formed on a substrate. However, the temperature of soldering process is raised as a solder material becomes lead free, the raised temperature allowed molten solder to be diffused to metal materials and a wiring pad to have extremely decreased conductivity, the connection reliability of solder joint was deteriorated as a result.

As a method to solve the problem mentioned above, for example, high-phosphorus type Ni—P plating solution is used to form an electroless Ni—P plating film of 10 μm in thickness on a substrate of metal material.

As a technique generally used to improve solder wettability of solder and an electroless Ni—P plating film, an electroless Ni—P plating film is laminated on metal material of a substrate and an electroless Au film of 0.05 μm in thickness is laminated on the electroless Ni—P plating film (Ni/Au film).

It is pointed out that, when lead-free solder is used, Ni plating film is lost due to the repetition of reflow and connection reliability of solder joint is decreased due to lowered adhesiveness. In Patent Document 1, thickness of the Au plating film of Ni/Au film is controlled to solve the problem. In Patent Document 2, P rich surface layer is formed by removing Ni from the surface of Ni plating film of Ni/Au laminated film.

PRIOR ART DOCUMENTS

Patent Documents

Patent Document 1: Japanese Laid-open publication No. 2002-327279
Patent Document 2: Japanese Laid-open publication No. 2010-147245

SUMMARY OF THE INVENTION

Problems to be Solved by the Invention

In recent years, the conductor has been provided with narrow pitch or fine wiring due to increasing demand for high density mounting of semiconductor substrates, and thinning of solder joint is required. However, thinning of an electroless Ni—P plating film was difficult, for the thinning of the electroless Ni—P plating film causes diffusion of molten solder to a metal material of a conductor by heat history.

It is an object of the present invention to provide a new electroless plating film which can prevent the diffusion of molten solder to a metal material constituting a conductor, and also to provide an electroless plating solution suitably used for the electroless plating film.

Solution to the Problems

An electroless Co—W plating film of the present invention which can solve above problems has following feature:

[1] An electroless Co—W plating film, wherein
content of W is in an amount of 35 to 58 mass %; and
a thickness of the film is 0.05 μm or more.
[2] The electroless Co—W plating film according to [1], wherein the electroless Co—W plating film is non-crystalline.
[3] The electroless Co—W plating film according to [1] or [2], wherein the film further contains B.
[4] A laminated plating film comprising:
the electroless Co—W plating film according to any one of [1] to [3];
an electro Ni—P plating film or an electroless Ni plating film.
[5] The laminated plating film according to [4], wherein the electroless Ni—P plating film contains P in an amount of 10 to 13 mass %.
[6] The laminated plating film according to [4] or [5], wherein the electro Ni plating film and the electroless Ni—P plating film have a thickness of 0.5 to 5 μm.
[7] A plating substrate, wherein the electroless Co—W plating film according to any one of [1] to [3] is formed on a surface of an object to be plated of the substrate.
[8] A plating substrate having the laminated plating film according to any one of [4] to [6], wherein the electroless Co—W plating film is formed on a surface of an object to be plated of the substrate; and
the electro Ni plating film or the electroless Ni—P plating film is formed on a surface of the electroless Co—W plating film.
[9] A plating solution to form the electroless Co—W plating film according to any one of [1] to [3], wherein the solution contains; water soluble salt of cobalt and water soluble salt of tungsten; and dialkylamine borane.
[10] The electroless Co—W plating solution according to [9], wherein the electroless Co—W plating solution contains the water soluble salt of cobalt (Co equivalent) at a concentration of 0.2 g/L or more and 5 g/L or less; the water soluble salt of tungsten (W equivalent) at a concentration of 1 g/L or more and 23 g/L or less.
[11] The electroless Co—W plating solution according to [9] or [10], wherein the electroless Co—W plating solution contains the dialkylamine borane at a concentration of 1.7 to 8.4 g/L.

Effects of the Invention

The diffusion of molten solder to a metal material constituting a conductor (herein after, the metal material is referred to as a conductor) can be prevented by the electroless Co—W plating film of the present invention. In addition, the present invention can provide an electroless Co—W plating solution suitable for the electroless Co—W plating is provided.

BRIEF DESCRIPTION OF THE DRAWINGS

FIG. 1 is a schematic sectional drawing of a plating base material of the present invention.

FIG. 2 is a schematic sectional drawing of a plating base material of the present invention.

FIG. 3 is a substitution picture for a drawing of a sample cross section of Example 1.

MODE FOR CARRYING OUT THE INVENTION

The inventors examined an electroless plating film having the barrier effect which can prevent the diffusion of molten solder to a conductor. As a result, the inventors found that the electroless Co—W plating film satisfying the following requirements exhibits the barrier property to molten solder. Except for the electroless Co—W plating film, the inventors also found, an electroless plating film such as an electroless Co—B plating film does not exhibit the barrier property. There are several possible reasons why an electroless plating film other than an electroless Co—W plating film does not have the barrier property. As one of the possibilities, molten solder may intrude from the defection of an electroless plating film caused by hydrogen gas generated during the formation of the electroless plating film.

The electroless Co—W plating film of the present invention has excellent barrier property and characterized by 35 to 58 mass % of content amount of W and the film thickness of 0.05 μm or more.

The electroless Co—W plating film of the present invention is described below.

Composition of Electroless Co—W Plating Film: 35 to 58 Mass % of W Content Amount The content amount of W (Tungsten) in the electroless Co—W plating film of the present invention is 35 to 58 mass %. By adjusting the content amount of W within the range above described, improved adhesion with an object to be plated is obtained as well as the barrier property. When the content amount of W is out of the range of 35 to 58 mass %, the barrier property and the improvement of adhesion is not obtained. Especially when the content amount of W is excessively low, even dense uniform electroless Co—W plating film does not have the barrier effect.

The content amount of W in the electroless Co—W plating film is preferably 55 mass % or less, more preferably 53 mass % or less, further preferably 50 mass % or less, and preferably 40 mass % or more, more preferably 45 mass % or more.

Content amount of Co in the electroless Co—W plating film of the present invention is not particularly limited. The content amount of Co may be the residual amount after the subtraction of above mentioned W content amount, or may be the residual amount after the subtraction of the content of W and the third constituent. The Co content amount is preferably 37 mass % or more, more preferably 42 mass % or more, further preferably 45 mass % or more, and further more preferably 50 mass % or more. The amount of Co is preferably 65 mass % or less, more preferably 60 mass % or less, and further preferably 55 mass % or less. When the third constituent is contained, the preferable amount of Co is the amount obtained by subtracting the content amount of the third constituent from the values mentioned above.

The electroless Co—W plating film of the present invention can contain alloy constituent (third constituent) other than Co (cobalt) and W (tungsten) as far as the third constituent does not inhibit the barrier property. B (boron) can be mentioned as an example of the third constituent.

Even if the third constituent is not positively added in the present invention, the third constituent originated from a plating solution may be contained in the plating film. For example, B may be contained in the electroless Co—W plating film and the B is originated from a reducing agent in the electroless Co—W plating solution.

When too much amount of the third constituent is contained in the electroless Co—W plating film, the characteristics of the film may be changed and the barrier property may not be obtained, so the content amount of the third constituent is preferably 0.7 mass % or less, more preferably 0.3 mass % or less, and further preferably 0 mass % (the third constituent is not contained).

Thickness of Electroless Co—W Plating Film: 0.05 μm or More

The electroless Co—W plating film which is dense and having the prescribed thickness needs to be uniformly formed on an object to be plated to have the barrier property. When the film thickness is less than 0.05 μm, the diffusion prevention effect is not obtained. When the film is too thin, dense electroless Co—W plating film is not uniformly formed, a void, the area which is not coated with the electroless Co—W plating film, is generated on a part of an subject to be plated, and molten solder is diffused to a conductor as a result. When the film formed on a conductor is too thin, the defects such as a surface scratch or a dent is not covered with the film, and molten solder is diffused from the uncovered part. In addition, the adhesiveness is not improved when the film is too thin.

The thickness of the electroless Co—W plating film is required to be 0.05 μm or more, preferably 0.1 μm or more, more preferably 0.15 μm or more, and further preferably 0.2 μm or more. Upper limit of the thickness of the electroless Co—W plating film is not particularly restricted in terms of the barrier property. However, considering of the thinning of solder joint, the upper limit is preferably 0.6 μm or less, more preferably 0.3 μm or less, and further preferably 0.25 μm or less.

Film Quality of Electroless Co—W Plating Film

Film quality of the electroless Co—W plating film of the present invention may be either crystalline or amorphous, and preferably the film is amorphous. An amorphous film shows superior excellent barrier property than a crystalline electroless Co—W plating film because intrusion of molten solder from crystal grain boundary does not occur for the amorphous film.

Electro Ni Plating Film or Electroless Ni—P Plating Film

In the present invention, laminated plating film may be formed by the above described electroless Co—W plating film with electro Ni plating film or electroless Ni—P plating film. Solder wettability of the film can be improved by forming electro Ni plating film or electroless Ni—P plating film (the films may be referred to as Ni plating film). Forming order of the plating film is, from a substrate side, electroless Co—W plating film and Ni plating film. Laminated film shows excellent solder wettability by forming the Ni plating film as an outermost layer contacting to solder.

Content amount of P in the electroless Ni—P plating film may be adjusted according to needs for obtaining desired effects, and the usable phosphorus type of the film may be low-phosphorus type (P content amount: 8 mass % or less), medium-phosphorus type (P content amount: more than 8 mass % and less than 10 mass %), or high-phosphorus type (P content amount: 10 to 13 mass %). In the present invention, high-phosphorus type electroless plating film is preferable, for the film has amorphous crystalline structure. When the electroless plating film has amorphous structure, excellent corrosion resistance and oxidation resistance are obtained. Medium-phosphorus type electroless plating film has both of microcrystalline and amorphous structure, therefore the film may be inferior in corrosion resistance. Low-phosphorus type electroless plating film has microcrystalline structure, and the film may be inferior in corrosion resistance. In the present invention, the electroless Ni—P plating film preferably contains no sulfur in terms of improving the corrosion resistance of the electroless Ni—P plating film.

Thickness of the Ni plating film is not particularly restricted, and increased thickness of the film can enhance above mentioned effect of the Ni plating film. Excessive increase in the thickness of the Ni plating film results in saturated effects. In the present invention, the electroless Co—W plating film having the barrier effect is formed on an object to be plated side, molted solder does not diffuse to a conductor even if the Ni plating film is thinner than conventionally used Ni plating film.

The thickness of the Ni plating film is preferably 0.5 μm or more, more preferably 0.7 μm or more, further preferably 1.0 μm or more, and further more preferably 2.0 μm or more. The thickness of the Ni plating film is preferably 5 μm or less and more preferably 3 μm or less.

Plating Base Material

The present invention includes the base material in which the electroless Co—W plating film is formed contacting with the surface of an object to be plated. The barrier effect of the electroless Co—W plating film of the present invention can prevent intrusion of molten solder through the electroless Co—W plating film. As shown in FIG. 1, the electroless Co—W plating film 3 may be formed on the surface of the conductor 2 formed on the substrate 1. When a plating film is optionally formed on the surface of a conductor as needed, though the film is not shown in Figures, the electroless Co—W plating film may be formed contacting with the plating film.

By forming the electroless Co—W plating film of the present invention on the surface of a conductor, high adhesiveness of the electroless Co—W plating film to the conductor is achieved as well as the barrier property. The electroless Co—W plating film of the present invention which satisfies above described requirements shows excellent adhesiveness to a metal material, especially Al, Al alloy, Cu, and Cu alloy.

As a preferable embodiment of the present invention, the present invention also includes the plating substrate in which above described Ni plating film is further formed. The laminated plating film is preferably two-layer structure of above described electroless Co—W plating film formed on the substrate and Ni plating film formed on the surface of the electroless Co—W plating film from a substrate side, and the laminated film may have three or more layers including optional plating film as needed. In the case of the two-layer structure, the following structure is preferable, the electroless Co—W plating film 3 is formed in contact with the surface of the conductor 2 formed on the substrate 1 as shown in FIG. 2, and the Ni plating film 4 is formed in contact with the surface of the electroless Co—W plating film 3.

One or more layers of the optional plating film is formed at any positions as underlying layer of the electroless Co—W plating film (conductor side), the intermediate layer between the electroless Co—W plating film and the Ni plating film, or the overlaying layer of the Ni plating film (opposite side of a conductor).

As an example of the optional layer, an electroless Au plating film, and/or an electroless Pd film can be mentioned.

An electroless Au plating film can enhance solder wettability by forming the film as an outermost layer contacting with solder. By forming an electroless Pd plating film as an underlying film of an electroless Au plating film, the underlying Pd plating film can prevent molten metal from diffusing to the overlaying film, the electroless Au plating film in this case, when the molten metal is generated under the Pd plating film.

Since the whole plating film thickness of the present invention is thinner than the existing plating film, the plating base metal of the present invention can contribute to thinning of various electronic parts such as a printed board or a semiconductor chip.

Herein after, the method for forming the electroless Co—W plating film of the present invention will be described.

In the present invention, an object to be plated is subjected to pretreatment such as degreasing or activation, and then the electroless Co—W plating film is preferably formed on the object.

As the object to be plated, a metal material constituting a conductor such as an electrode or a wiring formed on the surface of a substrate; any type of plating film formed on a conductor can be mentioned.

Examples of the any type of plating film include Al plating film of Al or Al alloy, Cu plating film of Cu or Cu alloy, or Ni plating film of Ni or Ni alloy.

As the metal material constituting the conductor, any metal materials can be used as long as they can be used to form the electroless Co—W plating film thereon, and the materials are exemplified by various known metal materials such as Al, Al alloy, Cu, and Cu alloy. Examples of the alloy components are known various alloy components such as Zn, Sn, Al, Cu, Be, Fe, and Mn. One or two more kinds of the alloy components can be used.

Examples of the substrate are known various insulation substrate such as resin substrate, ceramic substrate, glass substrate, and wafer substrate.

Existing pretreatment methods can be employed according to the material of an object to be plated. The pretreatment methods can be exemplified by degreasing, soft etching, pickling, and predip treatment. The pretreatment methods can be selected as needed. Also, a water washing treatment may be performed as needed after the above treatment. Each pretreatment can employ various known treatment methods and treatment conditions.

Electroless Co—W Plating Solution

In the electroless Co—W plating treatment, an object to be plated is soaked in the electroless Co—W plating solution to form the electroless Co—W plating film. Soaking time of the object to be plated is not particularly restricted, and the object to be plated is soaked in the solution for the time long enough to form the electroless Co—W plating film of predetermined thickness. In the electroless Co—W plating treatment, a plating solution can be agitated and an object can be rocked according to needs.

Electroless Co—W Plating Solution

The electroless Co—W plating solution of the present invention contains water soluble cobalt salt and water soluble tungsten salt as essential components. Above described electroless Co—W plating film can be formed on the surface of the object to be plated by carrying out the electroless Co—W plating treatment to the object to be plated by using the electroless Co—W plating solution of the present invention. The electroless Co—W plating film satisfying above described requirement needs to be formed to obtain the barrier property obtained by the electroless Co—W plating film of the present invention, the electroless Co—W plating solution needs to have properly controlled composition, temperature, pH, and processing time when the object to be plated is subjected to the plating treatment.

Water Soluble Cobalt Salt

Water soluble cobalt salt is a provision source of a cobalt ion. Cobalt ion as well as tungsten ion are the components of the plating film working as a barrier layer.

A provision source of a cobalt ion may be water soluble cobalt compound which can emit cobalt ion, and water soluble cobalt salt is preferable.

Examples of the water soluble cobalt salt are inorganic water soluble cobalt salts such as cobalt sulfate and cobalt chloride; organic water soluble cobalt salts such as cobalt carbonate and cobalt acetate. An inorganic water soluble cobalt salt is preferably as a cobalt compound, and cobalt sulfate can be mentioned as more preferable cobalt compound. One or two more kinds of the water soluble cobalt salts can be used.

As to the concentration of water soluble cobalt salt (Co equivalent) in the electroless Co—W plating solution, a plating rate can be improved by increasing the concentration of water soluble cobalt salt, and thus obtained electroless Co—W plating film shows further more excellent barrier property. When the concentration of water soluble cobalt salt is too high, the high concentration causes decrease in stability of the electroless Co—W plating solution.

The concentration of the water soluble cobalt salt in the electroless Co—W plating solution is preferably 0.2 g/L or more, more preferably 1.0 g/L or more, further preferably 1.5 g/L or more, and preferably 5 g/L or less, more preferably 3 g/L or less, further preferably 2.5 g/L or less. The concentration of the water soluble cobalt salt is Co equivalent concentration and Co concentration is the total concentration of Co when using two or more types of water soluble cobalt salts.

Composition analysis of the plating solution of the present invention is carried out using ICP atomic emission spectroscopy.

Water Soluble Tungsten Salt

Water soluble tungsten salt is a provision source of a tungsten ion. Tungsten ion as well as cobalt ion are the components of the plating film working as a barrier layer.

A provision source of tungsten ion may be tungsten compound which can emit tungsten ion, and water soluble tungsten salt is preferable.

Examples of the water soluble tungsten salt are tungsten chloride, tungstic acid, and tungstic acid salt, and the tungstic acid are exemplified by sodium tungstate, potassium tungstate, and ammonium tungstate. One or two more kinds of the water soluble tungsten salts can be used.

As to the concentration of water soluble tungsten salt (W equivalent) in the electroless Co—W plating solution, a plating rate can be improved by increasing the concentration of water soluble tungsten salt, and thus obtained electroless Co—W plating film shows further more excellent barrier property. When the concentration of water soluble tungsten salt is too high, the high concentration causes decrease in stability of the electroless Co—W plating solution.

The concentration of the water soluble tungsten salt in the electroless Co—W plating solution is preferably 1 g/L or more, more preferably 3.5 g/L or more, further preferably 5.0 g/L or more, and further more preferably 7.0 g/L or more. The concentration of the water soluble tungsten salt is preferably 23 g/L or less, more preferably 20 g/L or less, further preferably 15 g/L or less, and further more preferably 9 g/L or less. It is more preferable for the water soluble tungsten salt has the concentration of 9 g/L or less, for thus obtained electroless Co—W plating film becomes amorphous. The concentration of the water soluble tungsten salt is W equivalent concentration and W concentration is the total concentration of W when using two or more types of water soluble tungsten salts.

Reducing Agent

Reducing agents used for the present invention have the reduction precipitation ability of cobalt ion and tungsten ion. Examples of the reducing agents are hypophosphorous acid; hypophosphites such as sodium hypophosphite, potassium hypophosphite, and ammonium hypophosphite; hydrazines such as hydrazine carbonate, hydrazine sulfate, dihydrazine sulfate, hydrazine hydrochloride; and dialkylamine borane. Dialkylamine borane is preferably among them, for dialkylamine borane can form amorphous electroless Co—W plating film.

The electroless Co—W plating film obtained by using the electroless Co-w plating solution contains B originate from dialkylamine borane.

Examples of the dialkylamine borane are dimethylamine borane, diethylamine borane, and trimethylamine borane, and dimethylamine borane is preferable among them. One or two more kinds of the dialkylamine borane can be used.

Concentration of the reducing agent in the electroless plating solution changes dependent on the type of the reducing agents, and the concentration is adjusted so that satisfactory reducing action is obtained. Considering of plating deposition rate, the concentration of the reducing agents are preferably increased, however, stability of plating solution is decreased when the concentration of the reducing agents are too high. Plating defect such as skip is further suppressed by increasing the concentration of dimethyl amine borane, and the electroless Co—W plating film is formed densely on an object without undeposited parts. In addition, the electroless Co—W plating film is formed uniformly without unevenness of appearance such as galling. When the concentration of the dialkylamine borane is too high, the stability of a plating bath may be decreased.

The concentration of dialkylamine borane is preferably 1.7 g/L or more, more preferably 3.0 g/L or more, further preferably 4.0 g/L or more, and preferably 8.4 g/L or less, more preferably 8 g/L or less. The concentration of dialkylamine borane is the total concentration of dialkylamine borane when using two or more types of dialkylamine boranes.

Complexing Agent

The electroless Co—W plating film of the present invention contains a complexing agent. The complexing agent is effective to deposition reaction of cobalt and tungsten.

The complexing agents are not particularly restricted as long as the complexing agents have above described effect. Examples of the complexing agents are organic acids such as citric acid, malic acid, succinic acid, acetic acid, malonic acid, acidum tartaricum, lactic acid, and oxalic acid; amino acids such as glycine, alanine, asparagine acid, and glutamic acid; amines such as ethylenediamine, triethanolamine, and EDTA. One or two more kinds of the complexing agents can be used.

When the concentration of the complexing agent in the electroless Co—W plating solution is too low, deposition of Co or W, or decomposition of the plating solution occur. When the concentration of the complexing agent in the electroless Co—W plating solution is too high, undeposited parts of the electroless Co—W plating film are generated.

Concentration of the complexing agents adjusted as needed so that the desired effect is obtained, and the concentration of the complexing agents is preferably 0.001 mol/L or more, more preferably 0.005 mol/L or more, further preferably 0.01 mol/L or more, and preferably 1 mol/L or less, more preferably 0.5 mol/L or less, further preferably 0.1 mol/L or less.

A water soluble cobalt salt solution and water soluble tungsten salt solution available as raw materials of the plating solution may contain a complexing agent. Addition of the complexing agents is not necessary when the electroless Co—W plating solution contains sufficient amount of the complexing agents originated from the raw materials, however, the complexing agents may be added to the electroless Co—W plating solution after preparation according to needs.

The electroless Co—W plating solution of the present invention is prepared by dissolving above described components in a solvent, preferably in water. The electroless Co—W plating solution of the present invention contains known additives according to needs. The additives are exemplified by a stabilizing agent, a pH conditioner, and a surfactant, and these additives may be originated form raw materials and contained in the electroless Co—W plating solution.

Content amount of an optional component such as an additive is not particularly restricted, and the additives may be contained in the range not inhibiting the bath stability of the electroless Co—W plating solution of the present invention and the barrier property and the adhesiveness of the electroless Co—W plating film formed on an object.

Stabilizing Agent

As a stabilizing agent, known stabilizing agent having an effect to stabilize a plating solution can be used.

Examples of the stabilizing agents are lead compounds such as lead nitrate and lead acetate; cadmium compounds such as cadmium nitrate and cadmium acetate; thallium compound such as thallium nitrate and thallium acetate; antimony compounds such as antimony chloride and potassium antimonyltartrate; chromium compounds such as chromium oxide and chromic sulphate. One or two more kinds of the stabilizing agent can be used.

Concentration of the stabilizing agent in the electroless Co—W plating solution is not restricted, and the stabilizing agent is contained to the extent that the stabilizing agent can improve the stability of a plating solution. The concentration of the stabilizing agent is preferably 0.01 mg/L or more, and more preferably 0.1 mg/L or more, and preferably 100 mg/L or less, and more preferably 10 mg/L or less. The concentration of the stabilizing agent is the total concentration of the stabilizing agents when using two or more types of the stabilizing agents.

pH Conditioner

As a pH conditioner, known pH conditioner having the effect of adjusting pH of the plating solution to a prescribed value can be used.

Examples of the pH conditioners include acids such as hydrochloric acid, sulfuric acid, and phosphoric acid; alkalis such as sodium hydroxide, potassium hydroxide, and aqueous ammonia can be used.

When the pH of the electroless Co—W plating solution is too low, the deposition rate of cobalt and tungsten is decreased, allowing the formation of the electroless Co—W plating film to be decreased and defects such as pore to be generated on the film surface. When the pH is too high, on the other hand, increased deposition rate of cobalt and tungsten makes the thickness control of the film difficult.

The electroless Co—W plating solution has the pH of preferably 7 or more, more preferably 8 or more, further preferably 9 or more, and preferably 12 or less, more preferably 11 or less, further preferably 10 or less.

Surfactant

One or two or more kinds of known surfactants such as nonionic, anionic, cationic, and amphoteric surfactants may be used.

Concentration of the surfactants in the electroless Co—W plating solution is not particularly restricted, and the surfactants may be added to the extent the effect of addition is obtained. The concentration of the surfactants are preferably 0.01 mg/L or more, more preferably 0.1 mg/L or more, and preferably 100 mg/L or less, more preferably 10 mg/L or less. The concentration of the surfactant is the total concentration of the surfactants when using two or more types of the surfactants.

Temperature

Solution temperature of the electroless Co—W plating solution at the time of plating treatment is adjusted for the film to have desired thickness in consideration of treatment time. The deposition rate is decreased when the solution temperature is too low. When the solution temperature is too high, on the other hand, the deposition rate becomes excess, or the composition of the solution may change due to increased water evaporation amount.

The solution temperature of the electroless Co—W plating solution is preferably 20° C. or higher, more preferably 25° C. or higher, further preferably 50° C. or higher, further more preferably 60° C. or higher, and preferably 90° C. or lower, more preferably 80° C. or lower, further preferably 75° C. or lower.

The electroless Co—W plating film is formed on the surface of the object to be plated by the electroless Co—W plating treatment described above.

After Treatment

The object to be plated after the electroless Co—W plating treatment may be subjected to conventionally known after treatment according to needs. As for example, Unnecessary plating components existing on the surface of the electroless Co—W plating film can be washed off by pickling treatment or water cleaning according to needs. Various know pickling methods and pickling conditions can be employed for the pickling treatment.

An electroless Ni—P plating film or an electro Ni plating film can be formed to the object to be plated after forming the Co—W plating film. Forming the electroless Ni—P plating film or the electro Ni plating film improves solder wettability.

Electroless Ni—P Plating Treatment

In addition to the Ni deposition on the surface of the electroless Co—W plating film, the electroless Ni—P plating treatment can form an electroless Ni—P plating film by the codeposition of phosphorus. Various known electroless Ni—P plating solution and plating conditions can be employed as the conditions of the electroless Ni—P plating treatment Electroless Ni—P Plating Solution Composition of the electroless Ni—P plating solution is not particularly restricted, and the composition of the solution is changeable according to use. Preferable electroless Ni—P plating solution is exemplified by the solution containing the water soluble nickel salt and the reducing agent.

The water soluble nickel salt is a provision source of nickel ion, and various know water soluble nickel salt emitting nickel ion can be used. The water soluble nickel salts are exemplified by inorganic water soluble nickel salts such as nickel sulfate, nickel chloride, and nickel hypophosphite, and organic water soluble nickel salts such as nickel acetate and nickel malate. One or two more kinds of the water soluble nickel salts can be used.

Concentration of the water soluble nickel salt in the electroless Ni—P plating solution can be selected according to use. By increasing the concentration of the water soluble nickel salt, the deposition rate of the electroless Ni—P plating film can be improved. When the concentration of the water soluble nickel salt is too high, the stability of the plating solution is decreased, or a pit is generated on the film.

The lower limit of the water soluble nickel salt (Ni equivalent) in the electroless Ni—P plating solution is 0.5 g/L or more, 1 g/L or more, 2 g/L or more, and 3 g/L or more in an order from the lowest concentration, and higher concentration is preferable among them. The upper limit of the water soluble nickel salt is 20 g/L or less, 15 g/L or less, and 10 g/L or less in this order, and lower concentration is preferable among them.

Reducing Agent

As a reducing agent, known phosphorated reducing agent for an electroless Ni plating solution can be used. Examples of the reducing agent is hypophosphite such as sodium hypophosphite or potassium hypophosphite.

Properly adjusted concentration of the reducing agent can effectively prevent decomposition of the plating solution or long-time film formation caused by slowed reduction of nickel ion in the plating solution.

The concentration of the hypophosphite is, for example, preferably 10 g/L or more, more preferably 40 g/L or less, and more preferably 35 g/L or less.

As to the concentration of phosphorus in the electroless Ni—P plating solution, any type from low-phosphorus type (content amount of P: 1 to 4 mass %), medium-phosphorus type (more than 4 mass % to less than 10 mass %), or high-phosphorus type (10 mass % to 13 mass %) of solution can be used, and preferable type of the solution is selected according to needs.

Complexing Agent

Complexing agent is an effective component to prevent deposition of Ni compound and have the nickel deposition reaction of moderate speed, and various known complexing agents used for the known electroless nickel plating solution can be used as the complexing agents of the present invention. Examples of the complexing agents are amino acids such as glycine, alanine, arginine, aspartic acid, and glutamic acid; monocarboxylic acids such as lactic acid, propionic acid, glycolic acid, and gluconic acid; dicarboxylic acids such as tartaric acid, oxalic acid, succinic acid, and malic acid; tricarboxylic acid such as citric acid, and the salts thereof are included to the examples. Examples of the salts are an alkali metal salt of sodium or potassium, an alkaline earth metal salt of calcium, or an ammonium salt. One or two more kinds of the complexing agents can be used.

Properly adjusted concentration of the complexing agent can prevent the deposition of nickel hydroxide and decomposition of the plating solution caused by overly rapid oxidation-reduction reaction. The complexing agent can also prevent slowing of deposition rate of nickel plating film and decrease in deposition evenness of the film caused by increased viscosity of the plating solution.

The concentration of the complexing agent is preferably 0.001 mol/L or more, more preferably 0.002 mol/L or more, and preferably 2 mol/L or less, more preferably 1 mol/L or less.

In some cases, water soluble nickel solution available as a raw material to prepare plating solution contains complexing agent. Addition of the complexing agent is not necessary when the electroless Ni—P plating solution contains sufficient amount of complexing agent originated from the raw materials, however, the complexing agent may be added to the electroless Ni—P plating solution after preparation according to needs.

Additives

Various known additives used for an electroless Ni—P plating solution can be added to the electroless Ni—P plating solution of the present invention according to needs. Examples of the additives are a reaction accelerator, a gloss agent, a surfactant, a function-adding agent, pH conditioner, and a stabilizer.

A sulfur-based additive is not preferably contained in the Ni—P plating solution of the present invention.

pH

When the pH of the electroless Ni—P plating solution is too low, the deposition rate of nickel is decreased with the decrease in the film formation, and defects such as a pore is generated on the surface of the film. When the pH is too high, on the other hand, the deposition rate of nickel becomes excess, and film formation becomes handled with difficulty. pH pf the electroless Ni—P plating solution is adjusted by using a pH conditioner.

The electroless Ni—P plating solution has the pH of preferably 3 or more, more preferably 4 or more, further preferably 4.5 or more, and preferably 8 or less, more preferably 7 or less, further preferably 6 or less.

Temperature

Solution temperature of the electroless Ni—P plating solution at the time of plating treatment is adjusted for the film to have desired thickness in consideration of treatment time. The deposition rate is decreased when the solution temperature is too low. When the solution temperature is too high, on the other hand, the deposition rate becomes excess, or the composition of the solution may change due to increased water evaporation amount.

The solution temperature of the electroless Ni—P plating solution is preferably 20° C. or higher, more preferably 25° C. or higher, further preferably 50° C. or higher, and preferably 95° C. or lower, more preferably 93° C. or lower, further preferably 90° C. or lower.

Electro Ni Plating Treatment

The electro Ni plating film may be formed on the surface of the electroless Co—W plating film to improve solder wettability. Ni is deposited and the electro Ni plating film is formed on the surface of the electroless Co—W plating film by the electro Ni plating treatment. As the conditions of the electro Ni plating, various known electro Ni plating solution and the plating conditions can be employed.

Electro Ni Plating Solution

The compositions of the electro Ni plating solution is not particularly restricted, and the compositions is suitably selected according to needs. Examples of the electro Ni plating solution is the electro Ni plating solution containing the water soluble nickel salt and a buffer material, a watts bath having nickel sulfate as a main constituent component, or a sulfamate bath having nickel sulfamate as main constituent component, and various known electro Ni plating solution can be used.

Examples of the water soluble nickel salts are nickel sulfate, nickel chloride, nickel bromide, nickel aminosulfonate, and methanesulfonate nickel. One or two more kinds of the water soluble nickel salts can be used.

Higher concentration of the water soluble nickel salt is preferable for the high concentration of the salt can improve current density, however, too high concentration of the salt water soluble nickel causes plating defects.

The concentration of the water soluble nickel salt in the electro Ni plating solution (Ni equivalent) is preferably 5 g/L or more, more preferably 7 g/L or more, and preferably 100 g/L or less, more preferably 50 g/L or less.

Buffer Material

As a buffer material, know various buffer materials used for an electro Ni plating solution can be used. Examples of the buffer materials available are water-soluble organic carboxylic acids and salts thereof such as a boric acid, a citric acid, a tartaric acid, a succinic acid, an acetic acid, and salts thereof. Examples of the salts includes ammonium salt, magnesium salt, aluminum salt, calcium salt, and barium salt. One or two more kinds of the buffer materials can be used.

Concentration of the buffer material in the electroless Ni plating solution is adjusted according to needs, and the concentration is, for example, preferably 20 g/L or more, more preferably 40 g/L or more, and preferably 100 g/L or less, more preferably 80 g/L or less.

A water soluble Ni salt solution available as a raw material for the preparation of a plating solution may contain buffer materials. Addition of the buffer materials is not necessary when the electro plating Ni solution contains enough amount of the buffer materials, the buffer materials may be added to the prepared electro Ni plating solution according to needs.

Additives

The electro Ni plating solution can contain various known additives such as a brightening agent, a smoothing agent, an electrolyte auxiliary, and a pit prevention agent.

pH

The electro Ni plating solution has adjusted pH so that the solution can have appropriated current efficiency, and the pH is adjusted, for example, within the range of pH 3 to 6.

Temperature

Solution temperature of the electro Ni plating solution at the time of plating treatment is adjusted for the film to have desired thickness in consideration of treatment time according to needs. The deposition rate is decreased when the solution temperature is too low. When the solution temperature is too high, on the other hand, the deposition rate becomes excess, allowing plating defects to occur.

The temperature of the electro Ni plating solution is preferably 20° C. or higher, more preferably 25° C. or higher, further preferably 50° C. or higher, and preferably 90° C. or lower, more preferably 80° C. or lower, further preferably 75° C. or lower.

Current Density

Cathode current density is appropriately adjusted to improve the deposition rate as well as to form uniform plating film, and the current density is preferably 0.01 A/dm$^2$ or more, 0.1 A/dm$^2$ or more, and preferably 100 A/dm$^2$ or less, more preferably 50 A/dm$^2$ or less.

Anode

Various know nickel plates used an anode for electro Ni plating can be used.

EXAMPLES

Hereinafter, the present invention is described in more detail with reference to Examples. The present invention is not restricted by the Examples, may be carried out with appropriate modifications to the extent adaptable to the gist of the above and the following description. These variations are included in the technical scope of the present invention.

Object to be Plated

As an object to be plated, Hull Cell copper plate (B-60-P05, YAMAMOTO-MS Co., Ltd.) was used. The electroless Co—W plating treatment was carried out using the copper plate after conducting following pretreatments.

Pretreatment

At first, the above object to be plated was subjected to degreasing treatment (50° C., 5 mins) using a cleaner (ACL-007, Uyemura Co., Ltd.). Next, soft etching treatment was carried out using 100 g/L of Sodium peroxyodisulfate solution (SPS) and 10 g/L of sulfuric acid ($H_2SO_4$) solution. Then, the object to be pated was subjected to acid pickling treatment (25° C., 1 min) to remove etching residue using 10% of sulfuric acid ($H_2SO_4$) solution and predip treatment (25° C., 1 min) using 3% of sulfuric acid($H_2SO_4$) solution.

Electroless Co—W Plating Treatment

After the pretreatments, the object to be treated was subjected to electroless Co—W plating treatment by soaking the object to be treated in the electroless Co—W plating solution (EPITHAS HWB-31, Uyemura Co., Ltd.) shown in Table 1. To a vessel, 500 mL of cobalt sulfate-containing liquid (EPITHAS HWB-31-M, Uyemura Co., Ltd.), 200 mL of ion exchanged water, 40 mL of water soluble tungsten-containing liquid (EPITHAS HWB-31-W, Uyemura Co., Ltd.), and 80 mL of dimethylamine borane-containing liquid (EPITHAS HWB-31-R, Uyemura Co., Ltd.) were added and agitated to obtain the electroless Co—W plating solution of Examples 1, 4, 5, and 6. pH of thus obtained solution was adjusted so as to be the pH shown in the table by adding 20% sodium hydroxide solution, or 10% sulfuric acid solution. Then the solution was agitated and heated till the solution reached bath temperature shown in table 1. For the other examples and comparative examples, the electroless Co—W plating solution was prepared by adjusting the concentration and the amount of addition in each solution so as to have the concentrations shown in the table.

After Co—W plating treatment, deposited quantity of thus obtained electroless Co—W plating film was analyzed using an atomic absorption spectrometer (Polarized Zeeman Atomic Absorption Spectrophotometer ZA3300, Hitachi, Ltd.).

Thickness of the electroless Co—W plating film was measured using a field-emission scanning electron microscope (FE-SEM: JSM-7800F, JEOL Ltd) with the plating film sample prepared by cutting the film by CP processing (ion milling processing) in the film thickness direction.

Observation conditions are as follows.

Measurement magnification: 1000 to 50000 times

Acceleration voltage: 10 kv

Irradiation current: 8

Detector: BED-C

With respect to film quality analysis, X-ray diffraction spectrum of the electroless Co—W plating film was measured by thin-film method using an X-ray diffractometer (RING-2500V, Rigaku Corporation). Measurement was carried out at any three points of the film, the film was described to be "amorphous material" when the measurement results at all the three points were amorphous, or the film was described to be "crystalline material" when the measurement results showed at least one crystalline point.

Conditions for X-ray diffraction are as follows.

X-ray

X-ray source: CuKα X-ray

X-ray output voltage: 50 kV

X-ray output current: 150 mA

Scanning field: 20 to 120°
Scan-step width: 0.02°
Scanning speed: 3°/min

Composition of Electroless Co—W Plating Film

Composition of the electroless Co—W film was analyzed dependent on X-ray photoelectron spectroscopy (XPS), and the measurement was carried out by analyzing film composition in film thickness direction (Depth direction) using an X-Ray photoelectron spectrometer (PHI Quantera II, ULVAC-PHI, Inc.).

Measurement conditions are as follows.
Measuring area: diameter of 100 μm
Etching rate: 0.8 nm/min
Analysis rate: every 3 nm Composition of electroless Co—W plating film was also analyzed from the cross section of the film using an Energy dispersive X-ray spectrometer (EDS JED-2300F) when cross section of the electroless Co—W plating film was observed for the film thickness using a field-emission scanning electron microscope (FE-SEM). The film composition was judged from the obtained XPS data, and EDS data of the film was used as reference for the film composition confirmation.

Measurement conditions are as follows:
Mode of measurement: quantitative analysis
Point analysis: Co, W
Acceleration voltage: 10 kV
Irradiation current: No. 10 to 12

Plating film other than the electroless Co—W plating film was measured similarly.

Electroless Ni—P Plating Treatment

Except for Example 6, the object plated with electroless Co—W plating described above was further soaked in a high phosphorus type electroless Ni—P plating solution (NIMUDEN DX, Uyemura Co., Ltd.) under the conditions shown in Table 1 to obtain a sample having electroless Ni—P plating film of 1 μm thickness on the surface of the electroless Co—W plating film.

Thus obtained electroless Ni—P plating film was measured for the film deposition amount and film thickness using the same equipment used for the measurement of electroless Co—W plating film.

Comparative Example 3

The sample of Comparative Example 3 was obtained by forming sequentially both of electroless Co plating film and electroless No—P plating film by the same method as Examples except that electroless Co plating treatment was carried out using the electroless Co plating solution shown in Table 1 instead of the electroless Co—W solution. The electroless Co plating solution was prepared using EPITHAS HWB-31-M and EPITHAS HWB-31-R both manufactured by Uyemura Co., Ltd. by the same solution preparation method as above described electroless Co—W plating solution.

Comparative Example 4

The sample of Comparative Example 4 was obtained by forming the electroless Ni—P plating film directly on the surface of the object to be plated without the formation of an electroless Co—W film on the subject.

The following properties of each sample were evaluated.

(1) Deposition property of electroless Co—W plating film

A cross section of the electroless Co—W plating film was exposed by cutting a sample, thus obtained sample was observed with above mentioned FE-SEM for the deposition property of the electroless Co—W plating film, and the deposition property was evaluated dependent on the criteria shown below. FE-SEM was operated at the magnifications of 10,000 to 30,000.

Dense: A substrate was coated with the electroless Co—W plating film, and non-plating portion rate of the film was 0%.

Rough: At least some uncoated areas by the electroless Co—W plating film were found. (The non-plating portion rate was over 0%).

(2) Deposition Property of Electroless Ni—P Plating Film

A cross section of the electroless Ni—P plating film was exposed by cutting a sample, thus obtained sample was observed with above mentioned FE-SEM for the deposition property of the electroless Ni—P plating film, and the deposition property was evaluated dependent on the criteria shown below. FE-SEM was operated at the magnifications of 10,000 to 30,000.

Dense: The electroless Co—W plating film was coated with the electroless Ni—P plating film, and non-plating portion rate of the film was 0%.

Rough: At least some uncoated areas by the electroless Ni—P plating film were found on the electroless Co—W plating film. (The non-plating portion rate was over 0%).

(3) Appearance of Electroless Co—W Plating Film

A cross section of the electroless Co—W plating film was observed (any three points) to evaluate the appearance using a metallographic microscope (BX51M, Olympus Corporation) and FE-SME at the magnifications of 1,000 to 30,000, and the appearance of the film was evaluated dependent on the following criteria.

Uniform: thickness of plating film was uniform.

Non-uniform: thickness of the electroless Co—W plating film was not uniform at some points.

(4) Appearance of Electroless Ni—P Plating Film

A cross section of the electroless Ni—P plating film was observed (any three points) to evaluate the appearance using a metallographic microscope (BX51M, Olympus Corporation) and FE-SME at the magnifications of 1,000 to 30,000, and the appearance of the film was evaluated dependent on the following criteria.

Uniform: thickness of electroless Ni—P plating film was uniform.

Non-uniform: thickness of the electroless Ni—P plating film was not uniform at some points.

(5) Barrier Property

Evaluation of Barrier Layer

Soldering of each sample, soldering treatment, reduction reflow by forming gas (H23%), was carried out using a reflow device (RSS-450-210, UniTemp corporation) at the reflow temperature (TOP temperature) shown in Table 1. The solder Sn—Cu—Ni solder manufactured by SENJU METAL INDUSTRY CO., LTD. was used for the soldering treatment. After the soldering, the samples were cut by CP processing (ion milling processing), and a cross section was observed using above described FE-SEM at the microscope magnifications of 1,000 to 30,000 to evaluate the diffusion state of the solder to the barrier layer and CU substrate.

With barrier function: No diffusion of molten solder was found on the substrate after soldering, and barrier effect was seen.

Without barrier function: Diffusion of molten solder was observed on at least a part of the Cu substrate after soldering, and barrier effect was not seen.

Evaluation of Diffusion State

In addition to the evaluation of barrier layer, diffusion state was also evaluated. At the time of the cross section observation of the cut section using FE-SEM, composition analysis of the cross section was performed using EDS to confirm again if there was solder diffusion on the Cu substrate or not. The microscope magnification was 1,000 to 30,000.

The diffusion state was evaluated dependent on the following criteria.

Excellent: No diffusion of solder was confirmed into Cu substrate
Poor: Diffusion of solder was confirmed into Cu substrate (6) Adhesiveness After a M5 nut was reflow soldered in the atmosphere on the electroless Ni—P plating film of a sample, adhesion strength was measured using a tensile strength test machine (1311VC, Aikoh Engineering Co., Ltd.) at the strength (N) described in Table 1.

Excellent: solder ruptures into pieces was found, fracture was between solders
Not Good: solder ruptures involving partial cleavage of the solder from a base material was found, and partial exposure of the base material was confirmed.
Poor: wholly rupture of solder from a base material was found, and the exposure of the base material was confirmed. Fracture was found between solder and a substrate.

TABLE 1

| | | | Unit | Example 1 | Example 2 | Example 3 | Example 4 | Example 5 |
|---|---|---|---|---|---|---|---|---|
| Treatment solution, treatment conditions | Electroless Co—W plating solution | Cobalt sulfate | Co concentration (g/L) | 2.4 | 2.4 | 2.4 | 2.4 | 2.4 |
| | | Water soluble tungsten salt | W concentration (g/L) | 7 | 9 | 2 | 7 | 7 |
| | | Dimethylamine borane | (g/L) | 8.4 | 8.4 | 8.4 | 8.4 | 8.4 |
| | | pH | | 9.3 | 9.3 | 9.3 | 9.3 | 9.3 |
| | Co—W plating conditions | Plating bath temperature | (° C.) | 75 | 75 | 75 | 75 | 75 |
| | | Soaking time | (min) | 10 | 10 | 10 | 60 | 5 |
| | Electroless NI—P plating solution (NIMUDEN DX initial make-up) | Nickel sulfate | Ni concentration (g/L) | 5 | 5 | 5 | 5 | 5 |
| | | Sodium hypophosphite | (g/L) | 25 | 25 | 25 | 25 | 25 |
| | | pH | | 4.6 | 4.6 | 4.6 | 4.6 | 4.6 |
| | Ni—P plating conditions | Plating bath temperature | (° C.) | 90 | 90 | 90 | 90 | 90 |
| | | Soaking time (desired thickess: 1 μm) | (min) | 4 | 4 | 4 | 4 | 4 |
| Barrier layer | Co—W plating film | Film thickness | (μm) | 0.1 | 0.1 | 0.1 | 0.6 | 0.05 |
| | | Crystalline/ amorphous | | amorphous | amorphous | amorphous | amorphous | amorphous |
| | | Co | (mass %) | 49.8 | 53.4 | 45.8 | 49.8 | 49.8 |
| | | W | (mass %) | 49.6 | 46.2 | 53.5 | 49.6 | 49.6 |
| | | B | (mass %) | contained | contained | contained | contained | contained |
| | | Deposition state | | dense | dense | dense | dense | dense |
| | | Appearance | | uniform | uniform | uniform | uniform | uniform |
| Outermost layer Ni—P plating | Ni—P plating film | Film thickness | (μm) | 1 | 1 | 1 | 1 | 1 |
| | | Ni | (mass %) | 90 | 90 | 90 | 90 | 90 |
| | | P | (mass %) | 10 | 10 | 10 | 10 | 10 |
| | | Deposition state | | dense | dense | dense | dense | dense |
| | | Appearance | | uniform | uniform | uniform | uniform | uniform |
| Properties | Evaluation points | Barrier property (Solder diffusion resistance) | Barrier layer evaluation | with barrier property | with barrier property | with barrier property | with barrier property | with barrier property |
| | | | Reflow TOP temperature | 300° C. | 300° C. | 300° C. | 300° C. | 300° C. |
| | | | Diffusuon state evaluation | Excellent | Excellent | Excellent | Excellent | Excellent |
| | | Adhesiveness | Strength (N) | 950 | 950 | 950 | 950 | 950 |
| | | | Mode | Excellent | Excellent | Excellent | Excellent | Excellent |

| | | | Unit | Example 6 | Example 7 | Example 8 | Example 9 | Example 10 |
|---|---|---|---|---|---|---|---|---|
| Treatment solution, treatment conditions | Electroless Co—W plating solution | Cobalt sulfate | Co concentration (g/L) | 2.4 | 2.4 | 0.24 | 2.4 | 2.4 |
| | | Water soluble tungsten salt | W concentration (g/L) | 7 | 22.5 | 2 | 7 | 2 |
| | | Dimethylamine borane | (g/L) | 8.4 | 8.4 | 1.7 | 4.2 | 4.2 |
| | | pH | | 9.3 | 9.3 | 9.3 | 9.3 | 9.3 |
| | Co—W plating conditions | Plating bath temperature | (° C.) | 75 | 75 | 75 | 75 | 75 |
| | | Soaking time | (min) | 10 | 20 | 10 | 10 | 10 |
| | Electroless NI—P plating solution | Nickel sulfate | Ni concentration (g/L) | W/O treatment | 5 | 5 | 5 | 5 |

TABLE 1-continued

|  |  |  | | | | | | |
|---|---|---|---|---|---|---|---|---|
| | (NIMUDEN DX initial make-up) | Sodium hypophosphite | (g/L) | | 25 | 25 | 25 | 25 |
| | | pH | | | 4.6 | 4.6 | 4.6 | 4.6 |
| | Ni—P plating conditions | Plating bath temperature | (° C.) | — | 90 | 90 | 90 | 90 |
| | | Soaking time (desired thickess: 1 μm) | (min) | — | 4 | 4 | 4 | 4 |
| Barrier layer | Co—W plating film | Film thickness | (μm) | 0.1 | 0.1 | 0.06 | 0.1 | 0.1 |
| | | Crystalline/amorphous | | amorphous | crystalline | amorphous | crystalline | crystalline |
| | | Co | (mass %) | 49.8 | 42.8 | 47 | 50.6 | 51.4 |
| | | W | (mass %) | 49.6 | 56.7 | 52.4 | 49 | 48.3 |
| | | B | (mass %) | contained | contained | contained | contained | contained |
| | | Deposition state | | dense | dense | dense | dense | dense |
| | | Appearance | | uniform | uniform | uniform | uniform | uniform |
| Outermost layer Ni—P plating | Ni—P plating film | Film thickness | (μm) | W/O treatment | 1 | 1 | 1 | 1 |
| | | Ni | (mass %) | | 90 | 90 | 90 | 90 |
| | | P | (mass %) | | 10 | 10 | 10 | 10 |
| | | Deposition state | | — | dense | dense | dense | dense |
| | | Appearance | | — | uniform | uniform | uniform | uniform |
| Properties | Evaluation points | Barrier property (Solder diffusion resistance) | Barrier layer evaluation | with barrier property | with barrier property | with barrier property | with barrier property | with barrier property |
| | | | Reflow TOP temperature | 280° C. | 280° C. | 300° C. | 300° C. | 280° C. |
| | | | Diffusuon state evaluation | Excellent | Excellent | Excellent | Excellent | Excellent |
| | | Adhesiveness | Strength (N) | impossible | 950 | 950 | 950 | 950 |
| | | | Mode | | Excellent | Excellent | Excellent | Excellent |

| | | | | Unit | Comparative Example 1 | Comparative Example 2 | Comparative Example 3 | Comparative Example 4 |
|---|---|---|---|---|---|---|---|---|
| | Treatment solution, treatment conditions | Electroless Co—W plating solution | Cobalt sulfate | Co concentration (g/L) | 0.24 | 2.4 | 2.4 | — |
| | | | Water soluble tungsten salt | W concentration (g/L) | 2 | 0.05 | none | — |
| | | | Dimethylamine borane | (g/L) | 1.7 | 8.4 | 8.4 | — |
| | | | pH | | 9.3 | 9.3 | 9.3 | — |
| | | Co—W plating conditions | Plating bath temperature | (° C.) | 50 | 75 | 75 | — |
| | | | Soaking time | (min) | 20 | 10 | 20 | — |
| | | Electroless Ni—P plating solution | Nickel sulfate | Ni concentration (g/L) | 5 | 5 | 5 | 5 |
| | | (NIMUDEN DX initial make-up) | Sodium hypophosphite | (g/L) | 25 | 25 | 25 | 25 |
| | | | pH | | 4.6 | 4.6 | 4.6 | 4.6 |
| | | Ni—P plating conditions | Plating bath temperature | (° C.) | 90 | 90 | 90 | 90 |
| | | | Soaking time (desired thickess: 1 μm) | (min) | 4 | 4 | 4 | 4 |
| Barrier layer | | Co—W plating film | Film thickness | (μm) | 0.03 | 0.1 | 0.2 | — |
| | | | Crystalline/amorphous | | amorphous | amorphous | amorphous | — |
| | | | Co | (mass %) | 47 | 62.6 | 85.8 | — |
| | | | W | (mass %) | 52.4 | 28.9 | none | — |
| | | | B | (mass %) | contained | contained | contained | — |
| | | | Deposition state | | dense | dense | rough | — |
| | | | Appearance | | uniform | uniform | uniform | — |
| Outermost layer Ni—P plating | | Ni—P plating film | Film thickness | (μm) | 1 | 1 | 1 | 1 |
| | | | Ni | (mass %) | 90 | 90 | 90 | 90 |
| | | | P | (mass %) | 10 | 10 | 10 | 10 |
| | | | Deposition state | | dense | dense | dense | dense |
| | | | Appearance | | uniform | uniform | uniform | uniform |
| Properties | | Evaluation points | Barrier property (Solder diffusion resistance) | Barrier layer evaluation | w/o barrier property | with barrier property | w/o barrier property | w/o barrier property |
| | | | | Reflow TOP temperature | 300° C. | 300° C. | 280° C. | 280° C. |
| | | | | Diffusuon state evaluation | Poor | Poor | Poor | Poor |
| | | | Adhesiveness | Strength (N) | 700 | 700 | — | 450 |
| | | | | Mode | Not Good | Not Good | | Poor |

From the experimental results described above, the properties of the films of Examples 1 to 10 are as follows.

Examples 1 to 10 were the examples of the electroless Co—W plaiting film satisfying the requirements of the present invention. All these films showed excellent barrier property. In addition, adhesion property was also improved, and there was no peeling off of film between the substrates and the electroless Co—W plating films of the Examples. FIG. 3 shows a microscope photograph of Example 1 for the evaluation of barrier property evaluation.

Electroless Ni—P plating film was further formed in Examples 1 to 5 and 7 to 10, and the laminated plating film showed improved solder wettability was improved. Therefore, no stripping off between solder and the electroless Ni—P plating film.

Electroless Ni—P plating film was not formed in Example 6. The electroless Ni—P plating film showed poor solder wettability, and adhesiveness of the film of Example 6 was not able to be evaluated.

The laminated films of Examples 1 to 5, 8, 9 (300° C.) and Examples 7 and 10 (280° C.) showed excellent barrier property though reflow temperature of soldering was severe.

The electroless Co—W plating film of Comparative Example 1 was thin its film thickness. The film was too thin and desired barrier effect was not achieved, so diffusion of molten solder was confirmed on the substrate. In addition, adhesiveness of the film was not sufficient, and a part of the electroless Co—W plating film was peeled off. The film of Comparative Example 1 had poor barrier property even when the reflow temperature was changed to 280° C. in Comparative Example 1.

The content amount of W in the Co—W plating film was little in Comparative Example 2. Due to the little content amount of W, diffusion of molten solder was confirmed on the substrate in Comparative Example 2. Similarly with Comparative Example 1, sufficient adhesiveness of film was not obtained. The film of Comparative Example 2 had poor barrier property even when the reflow temperature was changed to 280° C. in Comparative Example 2.

Instead of an electroless Co—W plating film, the electroless Co—B plating film was formed in Comparative Example 3. Barrier property was not obtained for the film of Comparative Example 3. The film of Comparative Example 3 had extremely poor solder wettability, so the M5 nut needed for the test of adhesiveness was not soldered.

Only the electroless Ni—P plating film was formed on the substrate in Comparative Example 4. The film of Comparative Example 4 did not have barrier property. In addition, adhesiveness of the film was poor, so the fracture was found between the solder and the substrate.

EXPLANATION OF LETTERS OR NUMERALS

1: substrate
2: conductor
3: electroless Co—W plating film
4: Ni plating film
5: solder

The invention claimed is:

1. An electroless Co—W plating film, wherein
the film is non-crystalline;
a content of W is in an amount of 35 to 58 mass %; and
a thickness of the film is 0.05 μm or more.

2. The electroless Co—W plating film according to claim 1, wherein the film further contains B.

3. A plating substrate having an object to be plated formed thereon, wherein the electroless Co—W plating film according to claim 1 is formed on a surface of the object to be plated.

4. A laminated plating film comprising:
the electroless Co—W plating film according to claim 1; and
an electroless Ni—P plating film or an electro Ni plating film.

5. The laminated plating film according to claim 4, comprising the electroless Ni—P plating film, wherein the electroless Ni—P plating film contains P in an amount of 10 to 13 mass %.

6. The laminated plating film according to claim 4, wherein the electro Ni plating film and the electroless Ni—P plating film each have a thickness of 0.5 to 5 μm.

7. A plating substrate having an object to be plated formed thereon, and the laminated plating film according to claim 4 formed on the object to be plated, wherein
the electroless Co—W plating film is formed on a surface of the object to be plated; and
the electro Ni plating film or the electroless Ni—P plating film is formed on a surface of the electroless Co—W plating film.

* * * * *